US012175936B2

(12) United States Patent
Kim et al.

(10) Patent No.: US 12,175,936 B2
(45) Date of Patent: Dec. 24, 2024

(54) DISPLAY APPARATUS

(71) Applicant: LG DISPLAY CO., LTD., Seoul (KR)

(72) Inventors: Jin-Hun Kim, Paju-si (KR); Ju-Hee Eun, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/426,443

(22) Filed: Jan. 30, 2024

(65) Prior Publication Data

US 2024/0257742 A1 Aug. 1, 2024

(30) Foreign Application Priority Data

Jan. 31, 2023 (KR) ........................ 10-2023-0013149

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2300/0861* (2013.01); *G09G 2320/0209* (2013.01); *G09G 2320/045* (2013.01)

(58) Field of Classification Search
CPC ... G09G 2300/0426; G09G 2300/0809; G09G 2310/0202; G09G 3/3233; G09G 2300/0819; G09G 2300/0842; G09G 2300/0861; G09G 2320/0209; G09G 2320/045; G09G 3/3275; H10K 59/121; H10K 59/131
See application file for complete search history.

(56) References Cited

U.S. PATENT DOCUMENTS 11,910,678 B1 * 2/2024 Zhang .................. G09G 3/3233
2019/0206976 A1 * 7/2019 Jeong .................. G09G 3/3225
2019/0278145 A1 * 9/2019 Tanaka ............. G02F 1/136286

* cited by examiner

*Primary Examiner* — Md Saiful A Siddiqui
(74) *Attorney, Agent, or Firm* — POLSINELLI PC

(57) ABSTRACT

A display apparatus includes: a display panel in which a display region including first to third regions is defined, and which includes a first data line and a second data line connected to first and second pixels of the first and second regions; a driving transistor, a sampling transistor, and a data supply transistor included in each of the first and second pixels; a vertical link line in the first region, and forming a parasitic capacitance with a first node of the first pixel; a horizontal link line in the third region, and connecting the vertical link line and the second data line; and a data compensation portion which calculates a voltage coupling amount caused in the first pixel according to a change of data voltage applied to the vertical link line and provided to the second pixels during the sampling section after the data writing section of the first pixel, calculates a compensation value for the voltage coupling amount, and applies the compensation value to a first input image data of the first pixel to generate a compensated image data.

19 Claims, 8 Drawing Sheets

DISPLAY APPARATUS

CROSS-REFERENCE TO RELATED APPLICATION

The present application claims the priority of Korean Patent Application No. 10-2023-0013149 filed on Jan. 31, 2023, which is hereby incorporated by reference in its entirety for all purposes as if fully set forth herein.

BACKGROUND

Field of the Disclosure

The present disclosure relates to a display apparatus.

Description of the Background

As information society develops, demand for display apparatuses for displaying images has increased in various forms, and recently, various flat display apparatuses such as organic light emitting display apparatuses and liquid crystal display apparatuses have been used.

The organic light emitting display apparatus has been widely used because it has advantages of small size, light weight, thinness, and low-power driving.

Recently, in the organic light emitting display apparatus, link lines that transmit data voltages are placed within a display region to implement a narrow bezel.

Accordingly, a parasitic capacitance is formed due to overlap between the link line and a pixel, causing crosstalk, which causes a problem of deteriorating image quality.

SUMMARY

Accordingly, the present disclosure is directed to a display apparatus that substantially obviates one or more of the problems due to limitations and disadvantages described above.

More specifically, the present disclosure is to provide a display apparatus which may improve crosstalk caused by a parasitic capacitance between a link line and a pixel.

Additional features and advantages of the disclosure will be set forth in the description which follows, and in part will be apparent from the description, or may be learned by practice of the disclosure. These and other advantages of the disclosure will be realized and attained by the structure particularly pointed out in the written description and claims hereof as well as the appended drawings.

To achieve these and other advantages and in accordance with the present disclosure, as embodied and broadly described herein, a display apparatus includes a display panel in which a display region including first to third regions arranged in a horizontal direction is defined, and which includes a first data line and a second data line extending in a vertical direction and connected to first pixels of the first region and second pixels of the second region, respectively; a driving transistor, a sampling transistor, and a data supply transistor included in each of the first and second pixels, the driving transistor whose gate electrode is connected to a first node, the sampling transistor connected between a first electrode of the driving transistor and the first node and turned on during a sampling section, and the data supply transistor connected to a second electrode of the driving transistor at a second node and turned on during a data writing section within the sampling section; a vertical link line disposed in the first region, extending in the vertical direction, and forming a parasitic capacitance with the first node of the first pixel; a horizontal link line disposed in the third region between the first and second regions, and connecting the vertical link line and the second data line; and a data compensation portion which calculates a voltage coupling amount caused in the first pixel according to a change of data voltage that is applied to the vertical link line and provided to the second pixels during the sampling section after the data writing section of the first pixel, calculates a compensation value for the voltage coupling amount, and applies the compensation value to a first input image data of the first pixel to generate a compensated image data.

In another aspect of the present disclosure, a display apparatus includes a display panel in which a first region and a second region disposed outside the first region in a horizontal direction are defined; a first data line and a second data line which extend in a vertical direction, and are connected to first pixels of the first region and second pixels of the second region, respectively; a driving transistor, a sampling transistor, and a data supply transistor included in each of the first and second pixels, the driving transistor whose gate electrode is connected to a first node, the sampling transistor connected between a first electrode of the driving transistor and the first node, and the data supply transistor connected to a second electrode of the driving transistor at a second node; a vertical link line disposed between the first data lines adjacent to each other in the first region, and forming a parasitic capacitance with the first node of the first pixel; a horizontal link line disposed between the first and second regions, and connecting the vertical link line and the second data line; and a data compensation portion which calculates a voltage coupling amount by applying a coupling gain to an amount of change in second input image data of the second pixels during a turn-on section of the sampling transistor of the first pixel after a horizontal period of the first pixel, calculates a compensation value by applying a compensation gain to the voltage coupling amount, and generates a compensated image data by applying the compensation value to a first input image data of the first pixel.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this specification, illustrate aspects of the disclosure and together with the description serve to explain the principles of the disclosure. In the Drawings.

DETAILED DESCRIPTION

Figure 1:
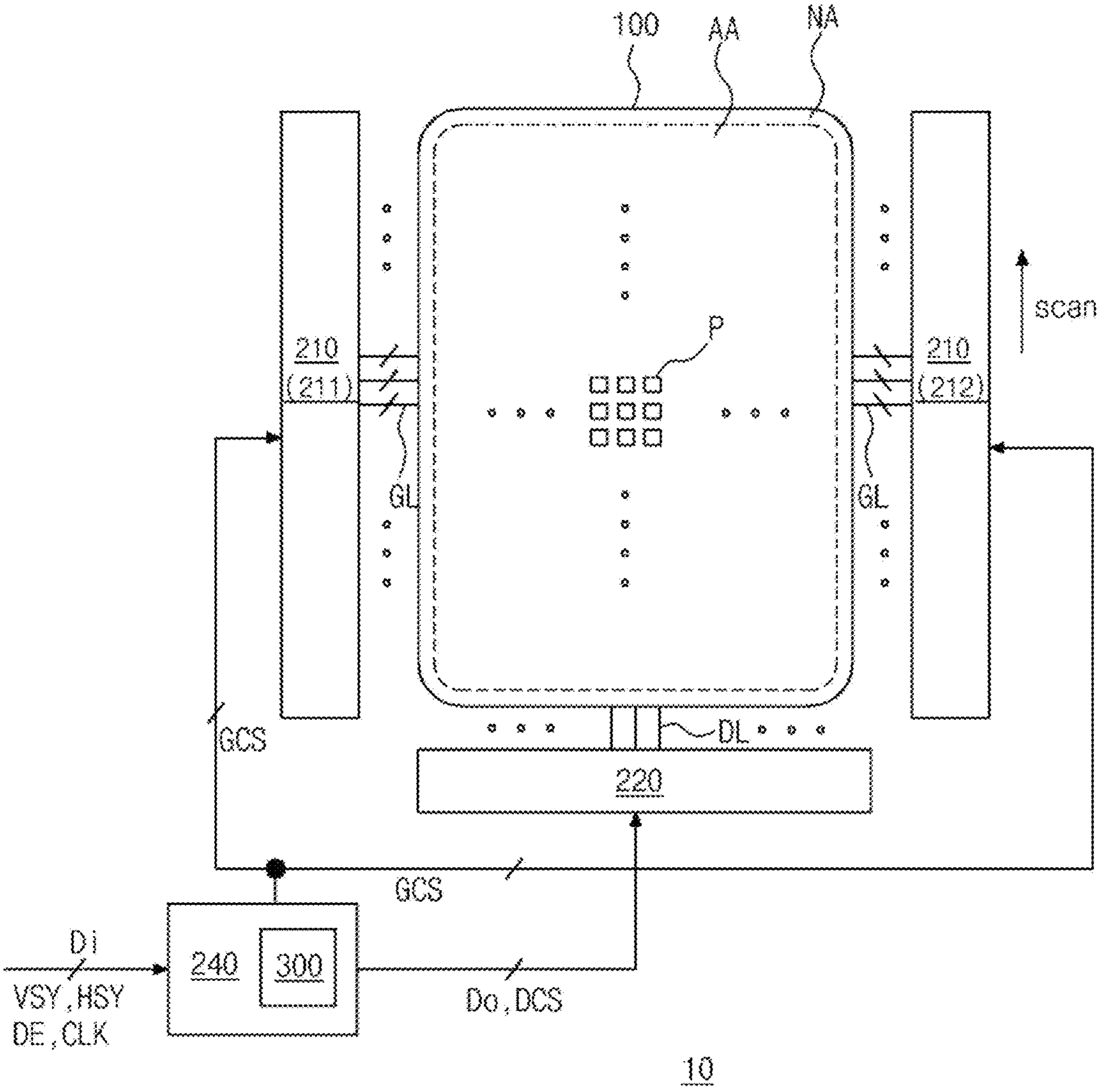
FIG. 1 is a view schematically illustrating a display apparatus according to an aspect of the present disclosure.

Advantages and features of the present disclosure and methods of achieving them will be apparent with reference to the aspects described below in detail with the accompanying drawings. However, the present disclosure is not limited to the aspects disclosed below, but may be realized in a variety of different forms, and only these aspects allow the present disclosure to be complete. The present disclosure is provided to fully inform the scope of the disclosure to the skilled in the art of the present disclosure, and the present disclosure may be defined by the scope of the claims.

The shapes, sizes, proportions, angles, numbers, and the like disclosed in the drawings for explaining the aspects of the present disclosure are illustrative, and the present disclosure is not limited to the illustrated matters. The same reference numerals refer to the same components throughout the description.

Furthermore, in describing the present disclosure, if it is determined that a detailed description of the related known technology unnecessarily obscure the subject matter of the present disclosure, the detailed description thereof may be omitted. When 'comprising', 'including', 'having', 'consisting', and the like are used in this disclosure, other parts may be added unless 'only' is used. When a component is expressed in the singular, cases including the plural are included unless specific statement is described.

In interpreting the components, even if there is no separate explicit description, it is interpreted as including a margin range.

In the case of a description of a positional relationship, for example, when the positional relationship of two parts is described as 'on', 'over', 'above', 'below', 'beside', 'under', and the like, one or more other parts may be positioned between such two parts unless 'right' or 'directly' is used.

In the case of a description of a temporal relationship, for example, when a temporal precedence is described as 'after', 'following', 'before', and the like, cases that are not continuous may be included unless 'directly' or 'immediately' is used.

In describing components of the present disclosure, terms such as first, second and the like may be used. These terms are only for distinguishing the components from other components, and an essence, order, sequence, or number of the components is not limited by the terms. Further, when it is described that a component is "connected", or "coupled" to another component, the component may be directly connected or contact the another component, but it should be understood that other component may be "interposed" between the components.

Respective features of various aspects of the present disclosure may be partially or wholly connected to or combined with each other and may be technically interlocked and driven variously, and respective aspects may be independently implemented from each other or may be implemented together with a related relationship.

Hereinafter, aspects of the present disclosure are described in detail with reference to the drawings. Meanwhile, in the following aspects, the same and like reference numerals are assigned to the same and like components, and detailed descriptions thereof may be omitted.

Figure 2:
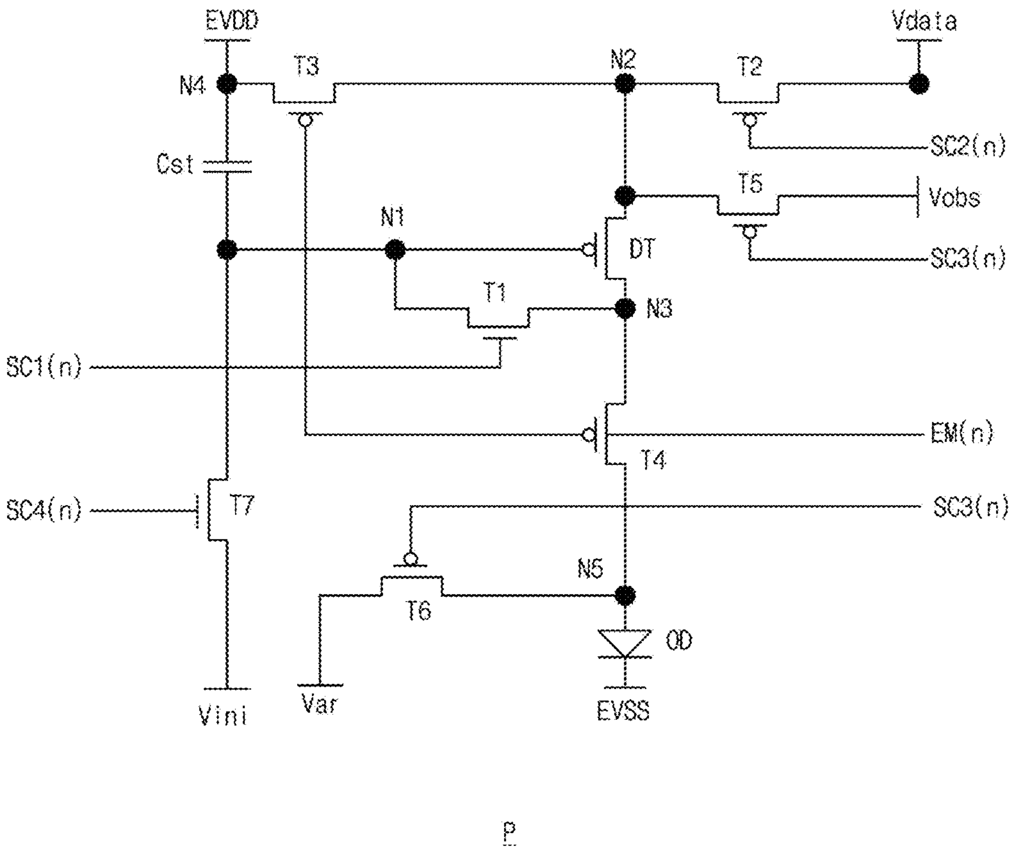
FIG. 2 is a circuit diagram schematically illustrating an example of a pixel according to an aspect of the present disclosure.
Figure 3:
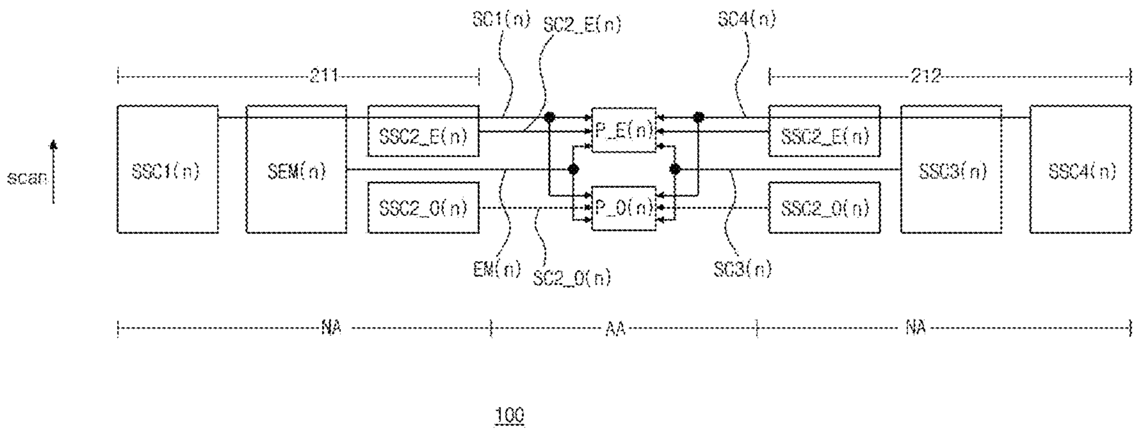
FIG. 3 is a block diagram schematically illustrating a configuration of a gate driving portion of a display apparatus according to an aspect of the present disclosure.

FIG. 1 is a view schematically illustrating a display apparatus according to an aspect of the present disclosure. FIG. 2 is a circuit diagram schematically illustrating an example of a pixel according to an aspect of the present disclosure. FIG. 3 is a block diagram schematically illustrating a configuration of a gate driving portion of a display apparatus according to an aspect of the present disclosure.

Prior to a detailed description, the display apparatus 10 according to this aspect may be any one of all types of display apparatuses, including a light emitting display apparatus equipped with a light emitting diode, in which crosstalk may occur due to a parasitic capacitance being formed between a link line (shown as VL in FIG. 4) and a pixel P in a display region AA.

Meanwhile, for convenience of explanation, in this aspect, a case in which an organic light emitting display apparatus is used as the display apparatus 10 is taken as an example.

Referring to FIGS. 1 to 3, the display apparatus 10 of this aspect may include a display panel 100 and a driving circuit portion that drives the display panel 100.

Here, the driving circuit portion may include, for example, a gate driving portion (or gate driving circuit) 210, a data driving portion (or data driving circuit) 220, and a timing control portion (or timing control circuit) 240.

The display panel 100 may include a display region AA that displays an image and a non-display region NA disposed outside the display region AA.

In the display region AA, a plurality of pixels P may be arranged in a matrix form along a plurality of horizontal lines (or row lines) and a plurality of vertical lines (or column lines).

Here, the plurality of pixels P may include pixels displaying different colors, for example, but not limited to, red, green, and blue pixels that display red, green, and blue, respectively.

In the display panel 100, various signal lines that transmit driving signals for driving the pixels P may be formed on a substrate.

In this regard, for example, a plurality of data lines DL transmitting data signals (or data voltages), which are image signals, may extend along the vertical direction and be connected to the pixels P on the corresponding vertical lines.

In addition, a plurality of gate lines GL that transmits gate signals (or gate voltages), which are scan signals, may extend along the horizontal direction and be connected to the pixels P of the corresponding horizontal lines.

In this aspect, a plurality of gate signals may be used to drive each pixel P, for example, first to fourth scan signals and an emission control signal may be used. Accordingly, a plurality of gate lines GL respectively transmitting a plurality of gate signals may be used. For example, first to fourth scan lines and an emission control line may be used. These multiple gate signals and gate lines GL are described in more detail below.

The pixels P may be defined by the data lines DL and the gate lines GL that cross each other.

Each pixel P may include a light emitting diode OD as a light emitting element, and a plurality of transistors and at least one capacitor for driving the light emitting diode OD.

Meanwhile, in this aspect, for convenience of explanation, as shown in FIG. 2, an 8T1C structure in which the pixel P is equipped with eight transistors T1 to T7 and DT and one capacitor Cst is taken as an example.

Referring to FIG. 2, the pixel P may include a first transistor T1 to a seventh transistor T7, which are a plurality of switching transistors, a driving transistor DT, a storage capacitor Cst, and a light emitting diode OD.

Each of the first to seventh transistors T1 to T7 and driving transistor DT may include a first electrode, a second electrode, and a gate electrode. One of the first electrode and the second electrode may be a source electrode, and the other of the first electrode and the second electrode may be a drain electrode.

Each of the first to seventh transistors T1 to T7 and driving transistors DT may be a P-type or N-type transistor. Meanwhile, in FIG. 2, a case in which the second, third, fourth, fifth, and sixth transistors T2, T3, T4, T5, and T6 are formed of P-type transistors, the first and seventh transistors T1, T7 are formed of N-type transistors, and the driving transistor DT is formed of a P-type transistor is taken as an example, but not limited thereto.

The first transistor T1 to the seventh transistor T7 and the driving transistor DT may include semiconductors made of the same material or may include semiconductors made of different materials. In this regard, for example, at least some of the first to seventh transistors T1 to T7 and the driving transistor DT may include one of a polycrystalline silicon layer, an oxide semiconductor layer, and an amorphous silicon layer.

Meanwhile, since the oxide semiconductor has excellent off-current characteristics and has characteristics suitable for a switching transistor, at least one of the first to seventh transistors T1 to T7 may include the oxide semiconductor layer. The polycrystalline silicon has excellent mobility, so the driving transistor DT may include the polycrystalline silicon layer. In this aspect, a case in which the N-type first and seventh transistors T1 and T7 include the oxide semiconductor layer, and the remaining transistors T2 to T6 and DT include a polycrystalline silicon layer is taken as an example.

The gate signals provided to an n-th horizontal line (more specifically, an odd-numbered horizontal line or an even-numbered horizontal line constituting the n-th horizontal line) in FIG. 2 is provided from a corresponding n-th stage of the gate driving portion 210. For example, four scan signals, first to fourth scan signals SC1(n) to SC4(n) and one emission control signal EM(n) may be provided. In this case, in the display region AA, first to fourth scan lines and an emission control line may be arranged, which are connected to the n-th stage and transmit the first to fourth scan signals SC1(n) to SC4(n) and the emission control signal EM(n) to the pixel P.

The first transistor T1 may serve as a sampling transistor, the second transistor T2 may serve as a data supply transistor, the third and fourth transistors T3 and T4 may serve as emission control transistors, the fifth transistor T5 may serve as a bias transistor, and the sixth and seventh transistors may serve as initialization transistors.

The light emitting diode OD may include an anode and a cathode. The anode of the light emitting diode OD may be connected to a fifth node N5, and the cathode may be connected to a low potential driving voltage EVSS.

The driving transistor DT may include a first electrode connected to a second node N2, a second electrode connected to a third node N3, and a gate electrode connected to a first node N1. The driving transistor DT may provide a driving current (or emission current) to the light emitting diode OD based on a voltage of the first node N1 (i.e., a data voltage Vdata stored in the storage capacitor Cst).

The first transistor T1 may include a first electrode connected to the first node N1, a second electrode connected to the third node N3, and a gate electrode that receives the first scan signal SC1(n). The first transistor T1 may be turned on during a sampling section in response to the first scan signal SC1(n), and form a diode connection between the first node N1 and the third node N3 to sample a threshold voltage (Vth) of the driving transistor DT, and to sample (or apply) the data voltage Vdata to the gate electrode of the driving transistor DT.

The storage capacitor Cst may be connected between the first node N1 and a fourth node N4. The storage capacitor Cst may store or maintain a high potential driving voltage EVDD provided thereto.

The second transistor T2 may include a first electrode connected to the data line DL (or receiving the data voltage Vdata), a second electrode connected to the second node N2, and a gate electrode that receiving the second scan signal SC2(n). The second transistor T2 may be turned on during a data writing section within the sampling section in response to the second scan signal SC2(n) and transmit the data voltage Vdata to the second node N2.

The third transistor T3 and the fourth transistor T4 (or the first and second light emission control transistors) may be connected between a line supplying the high potential driving voltage EVDD and the light emitting diode OD, and form a current movement path through which a driving current generated by the driving transistor DT moves.

The third transistor T3 may include a first electrode connected to a fourth node N4 to receive the high potential driving voltage EVDD, a second electrode connected to the second node N2, and a gate electrode receiving the emission control signal EM(n).

The fourth transistor T4 may include a first electrode connected to the third node N3, a second electrode connected to a fifth node N5 (or the anode of the light emitting diode OD), and a gate electrode receiving the emission control signal EM(n).

The third and fourth transistors T3 and T4 may be turned on in response to the emission control signal EM(n), and in this case, the driving current may be provided to the light emitting diode OD, and the light emitting diode OD may emit light with a luminance corresponding to the driving current.

The fifth transistor T5 may include a first electrode receiving a bias voltage Vobs, a second electrode connected to the second node N2, and a gate electrode receiving the third scan signal SC3(n).

The sixth transistor T6 may include a first electrode receiving a first initialization voltage Var, a second electrode connected to the fifth node N5, and a gate electrode receiving the third scan signal SC3(n).

The sixth transistor T6 may be turned on in response to the third scan signal SC3(n) before the light emitting diode OD emits light (or after the light emitting diode OD emits light), and may initialize the anode of the light emitting diode OD using the first initialization voltage Var.

The light emitting diode OD may have a parasitic capacitor formed between the anode and the cathode thereof. In addition, while the light emitting diode OD emits light, the parasitic capacitor may be charged so that the anode of the light emitting diode OD may have a certain voltage. Accordingly, by applying the first initialization voltage Var to the anode of the light emitting diode OD through the sixth transistor T6, an amount of charge accumulated in the light emitting diode OD may be initialized.

In this aspect, the gate electrodes of the fifth and sixth transistors T5 and T6 may be configured to commonly receive the third scan signal SC3 (n). However, it is not necessarily limited to this, and the gate electrodes of the fifth and sixth transistors T5 and T6 may be configured to be independently controlled by receiving separate scan signals.

The seventh transistor T7 may include a first electrode receiving a second initialization voltage Vini, a second electrode connected to the first node N1, and a gate electrode receiving the fourth scan signal SC4(n).

The seventh transistor T7 may be turned on in response to the fourth scan signal SC4(n), and may initialize the gate electrode of the driving transistor DT using the second initialization voltage Vini. Unnecessary charges may remain in the gate electrode of the driving transistor DT due to the high potential driving voltage EVDD applied to the storage capacitor Cst. Accordingly, by applying the second initialization voltage Vini to the gate electrode of the driving transistor DT through the seventh transistor T7, the remaining charge amount may be initialized.

The 8T1C structure of the pixel P described above is an example, and the pixel P of this aspect may have a different structure.

Referring again to FIG. 1, the gate driving portion 210 may receive the gate control signal GCS from the timing control portion 240, generates gate signals, and sequentially applies the gate signals to the plurality of gate lines GL. For example, the gate signals may be output sequentially in the vertical direction from bottom to top (or from top to bottom) in the drawing.

The gate driving portion 210 may be disposed, for example, on at least one side of the display region AA. In this aspect, a case where the gate driving portion 210 is configured to include first and second gate driving portions 211 and 212 disposed on both sides of the display region AA is taken as an example.

For example, the gate driving portion 210 may be formed directly in the non-display region NA on the substrate of the display panel 100 in a gate-in panel (GIP) structure, and in this case, the gate driving portion 210 may be formed in processes of forming elements of the display panel 100. As another example, the gate driving portion 210 may be configured to include at least one gate IC.

The gate driving portion 210 formed of a GIP structure is explained with further reference to FIG. 3. In FIG. 3, for convenience of explanation, a configuration of the gate driving portion 210 that drives an n-th horizontal line consisting of an n-th odd horizontal line (or 2n−1-th horizontal line) and an n-th even horizontal line (or 2n-th horizontal line) of the display region AA is taken as an example, where n is an integer.

The first gate driving portion 211 of the gate driving portion 210 may include, for example, a first scan driver (or first scan stage) SSC1(n), an emission driver (or emission stage) SEM(n), and odd and even second scan drivers (or odd and even second scan stages) SSC2_O(n) and SSC2_E (n).

The second gate driving portion 212 of the gate driving portion 210 may include, for example, a third scan driver (or third scan stage) SSC3(n), a fourth scan driver (or fourth scan stage) SSC4(n), and odd and even second scan drivers SSC2_O(n) and SSC2_E(n).

The arrangement of the first to fourth scan drivers SSC1 (n) to SSC4(n) and the emission drivers SEM(n) shown in FIG. 3 is an example, and they may be arranged in the first and second gate driving portions 211 and 212 in various combinations.

The first scan driver SSC1 (n) may generate the first scan signal SC1 (n) and output it to the corresponding first scan line. Accordingly, the pixel P_O (n) on the n-th odd horizontal line and the pixel P_E (n) on the n-th even horizontal line may commonly receive the first scan signal SC1 (n).

The odd second scan driver SSC2_O(n) may generate an odd second scan signal SC2_O(n) and output it to the corresponding odd second scan line. The even second scan driver SSC2_E(n) may generate an even second scan signal SC2_E(n) and output it to the corresponding even second scan line. Accordingly, the pixel P_O(n) on the n-th odd horizontal line may receive the odd second scan signal SC2_O(n), and the pixel P_E(n) of the n-th even horizontal line may receive the even second scan signal SC2_E(n). Here, the odd second scan signal SC2_O(n) and the even second scan signal SC2_E(n) may have different timings. For example, the odd second scan signal SC2_O(n) and the even second scan signal SC2_E(n) may be respectively applied for a horizontal period of the n-th odd horizontal line and a horizontal period of the n-th even horizontal line immediately following the horizontal period of the n-th odd horizontal line. The data supply transistors of the first and second pixels located on an odd horizontal line and an even horizontal line adjacent to each other respectively may receive odd and even second scan signals at different horizontal periods.

The third scan driver SSC3(n) may generate the third scan signal SC3(n) and output it to the corresponding third scan line. Accordingly, the pixels P_O(n) and P_E(n) on the n-th odd and even horizontal lines may commonly receive the third scan signal SC3(n).

The fourth scan driver SSC4(n) may generate the fourth scan signal SC4(n) and output it to the corresponding fourth scan line. Accordingly, the pixels P_O(n) and P_E(n) on the n-th odd and even horizontal lines may commonly receive the fourth scan signal SC4(n).

The emission driver SEM(n) may generate the emission control signal EM(n) and output it to the corresponding emission control line. Accordingly, the pixels P_O(n) and P_E(n) on the n-th odd and even horizontal lines may commonly receive the emission control signal EM(n).

Referring again to FIG. 1, the data driving portion 220 may receive image data (or output image data or compensated image data) Do and a data control signal DCS from the timing control portion 240. The data driving portion may convert the image data Do into data voltage Vdata, which is analog image data, in response to the data control signal DCS, and output the data voltage Vdata to the corresponding data line DL for each horizontal line of pixels.

Although not specifically shown, the data driving portion 220 may be configured to include at least one data IC. In this case, the data IC of the data driving portion 220 may be mounted on a flexible circuit film and connected to a non-display region NA on the corresponding side of the display panel 100, or may be directly mounted on the non-display region NA.

The timing control portion 240 may receive image data (or input image data) Di and various timing signals from an external host system through an interface such as a Low Voltage Differential Signaling (LVDS) interface or a Transition Minimized Differential Signaling (TMDS) interface. For example, the various timing signals may include a vertical synchronization signal VSY, a horizontal synchronization signal HSY, a data enable signal DE, and a dot clock signal CLK. The timing control portion 240 may use the timing signals VSY, HSY, DE, and CLK to generate and output the data control signal DCS and the gate control signal GCS to the data driving portion 220 and the gate driving portion 210.

Moreover, the timing control portion 240 may include a data compensation portion (or image compensation portion or image quality processing portion) 300 to compensate for crosstalk. In this regard, as a link line (shown as VL in FIG. 4) transmitting the data voltage Vdata and the pixel P overlap within the display region AA, parasitic capacitance may be generated and they may be electrically coupled, thereby causing crosstalk. The data compensation portion 300 may serve to compensate for the crosstalk.

The crosstalk compensation may be achieved through processes in which the data compensation portion 300 may calculate a coupling amount caused (or generated) by the parasitic capacitance, calculates a compensation value (or coupling compensation value or crosstalk compensation value) that may compensate for the calculated coupling amount, and reflect (or apply) the compensation value to the input image data Di.

The structure and method for compensating for the crosstalk caused by the parasitic capacitance between the link line and the pixel P in the display region AA is described in more detail below.

Figure 4:
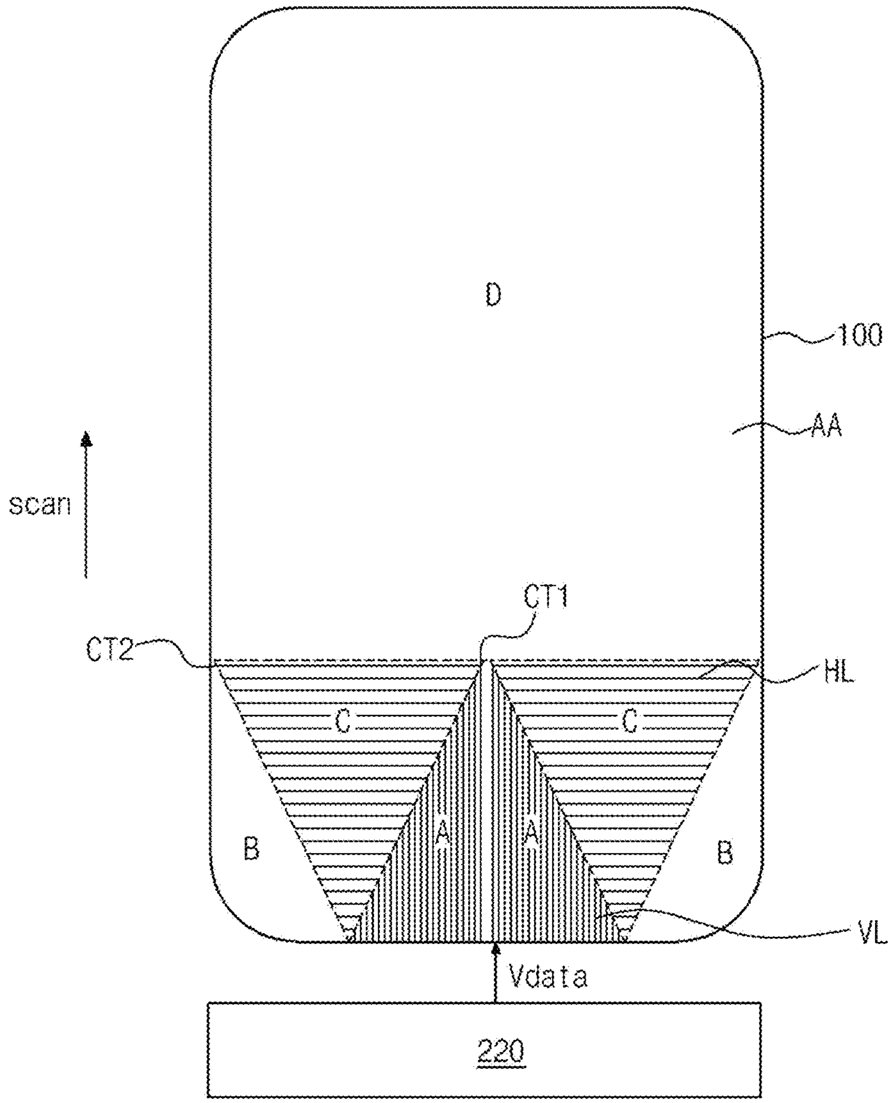
FIG. 4 is a view schematically illustrating an arrangement of link lines formed in a display panel according to an aspect of the present disclosure.
Figure 5:
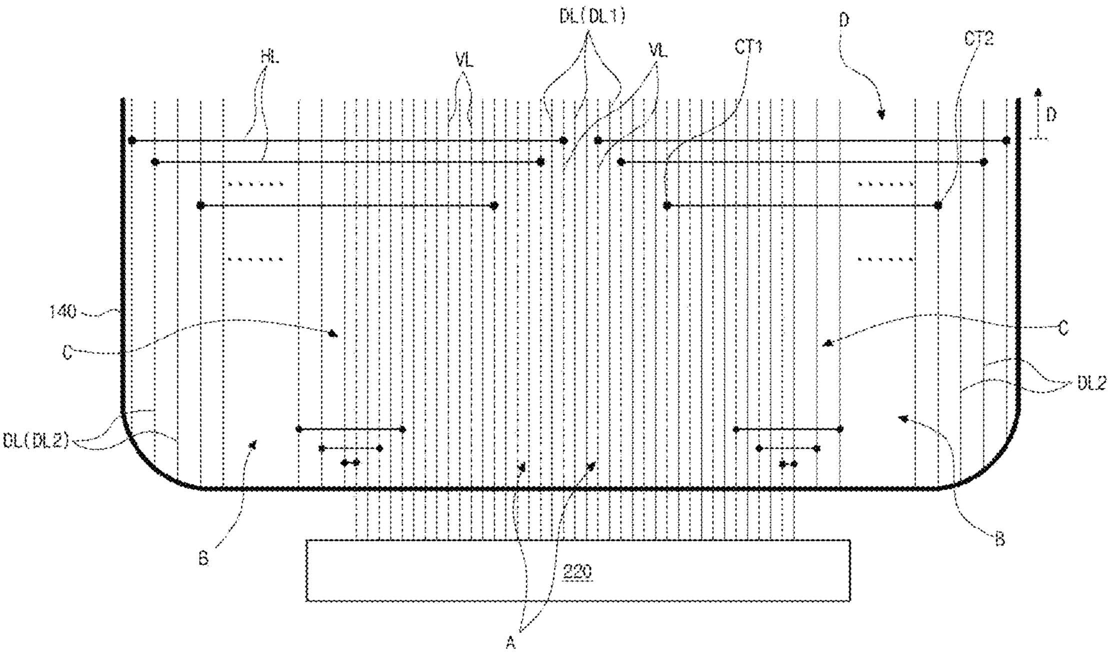
FIG. 5 is an enlarged view of a portion of a display panel where link lines are formed in FIG. 4.

FIG. 4 is a view schematically illustrating an arrangement of link lines formed in a display panel according to an aspect of the present disclosure, and FIG. 5 is an enlarged view of a portion of a display panel where link lines are formed in FIG. 4. For convenience of explanation, a non-display region is not shown in FIGS. 4 and 5.

Referring to FIGS. 4 and 5 along with FIGS. 1 to 3, a plurality of data lines DL extending in the vertical direction may be formed in the display panel 100. Some of the plurality of data lines DL, for example, first data lines DL1 disposed in a center of the display region AA may be electrically connected to the data driving portion 220 at one ends thereof, for example, at lower ends in the drawing to receive the corresponding data voltages Vdata, and may transmit the data voltages Vdata to the pixels P connected to the data lines DL.

Moreover, in the display panel 100, a plurality of vertical link lines (or first link lines) VL extending vertically, and a plurality of horizontal link lines (or second link lines) HL extending horizontally may be formed at a portion of the display panel 100 adjacent to the data driving portion 220, for example, a lower portion of the display panel 100.

The vertical link lines VL and horizontal link lines HL may extend within the display region AA, and may electrically connect other some, different from the first data lines DL1, among the plurality of data lines DL, for example, second data lines DL2 to the data driving portion 220. The second data lines DL2 may be located, for example, on both side portions of the display region AA (i.e., left and right portions of the display region AA in the drawing).

In this regard, for example, the vertical link line VL may be electrically connected to the data driving portion 220 at one end thereof to receive the corresponding data voltage Vdata. In addition, the vertical link line VL may be connected to the horizontal link line HL at a first connection point CT1 located within the display region AA.

In addition, the horizontal link line HL may be connected to the corresponding second data line DL2 at a second connection point CT2 which is located within the display region AA and is opposite to the first connection point CT1. For example, the horizontal link lines HL may increase in length (or may be lengthened) as they move away from an end (e.g., a lower end) of the display panel 100, where the data driving portion 220 is connected (or to which the data voltage Vdata is input), in the vertical direction, but not limited thereto.

Accordingly, the second data line DL2 may be electrically connected to the data driving portion 220 through the horizontal link line HL and the vertical link line VL connected to (or corresponding to) the second data line DL2. As such, using the horizontal link line HL and vertical link line VL arranged in the display region AA, a transmission path of the data voltage Vdata between the second data line DL2 and the data driving portion 220 may be established.

As above, in this aspect, the first data line DL1 located in the center of the display region AA may be substantially connected to the data driving portion 220 to receive the corresponding data voltage Vdata. The second data line DL2 located in both side portions of the display region AA may be connected to the data driving portion 220 via the link lines HL and VL arranged in the display region AA to receive the corresponding data voltage Vdata.

As such, as the link lines HL and VL that transmit the data voltage Vdata are formed within the display region AA, a size of the non-display region NA of the display panel 100 (e.g., the lower non-display region in the drawing) to which the data driving portion 220 is connected may be reduced, so that a narrow bezel may be effectively implemented.

Meanwhile, the vertical link line VL may be formed between, for example, two neighboring data lines DL. In other words, two data lines DL may be placed on both sides of the vertical link line VL in the horizontal direction.

As the vertical link line VL is disposed between the data lines DL in this way, it may overlap with the pixel P located between the data lines DL.

Accordingly, a parasitic capacitance (or parasitic capacitor) (Cpara in FIG. 7) may be formed between the vertical link line VL and the pixel P, for example, a first node of the pixel P. Accordingly, when a change (or toggle) in the data voltage Vdata occurs in the vertical link line VL, voltage coupling is caused within the pixel P due to the change in the data voltage Vdata, which may have an effect of distorting a data voltage charging amount. As such, crosstalk occurs in the pixels P arranged along the extension direction of the vertical link line VL due to the coupling effect.

This crosstalk occurs in regions where the vertical link lines VL, which are electrically connected to the second data lines DL2, are disposed.

In this regard, for convenience of explanation, the display region AA may be divided as follows. For example, a portion of the display region AA where the plurality of horizontal link lines HL are arranged may be referred to as a third region C. In addition, a portion of the display region AA which is disposed outside the third region C may be referred to as a second region B, and the second connection points CT2 between the plurality of horizontal link lines HL and the corresponding second data lines DL2 may form a boundary between the third region C and the second region B. In addition, a portion of the display region AA which is disposed inside the third region C may be referred to as a first region A, and the first connection points CT1 between the plurality of horizontal link lines HL and the corresponding vertical link lines VL may form a boundary between the third region C and the first region A. In addition, a portion of the display region where the horizontal link lines HL are not arranged, for example, an upper region of the display region AA in the drawing may be referred to as a fourth region D.

In the case of dividing the regions as above, in the first region A, the first data lines DL1 may be disposed vertically across the first region A, and the first region A may receive the data voltages Vdata through the first data lines DL1. The boundary between the first region A and the third region C may, for example, be inclined inward toward the top of the display panel 100. In other words, the first region A may have an approximately triangular shape (or tapered shape) whose width becomes narrower toward the top of the display panel 100. The first region A may be considered as having a shape that is a combination of the first regions A which are two roughly right-triangular parts on the left and right.

In addition, in the second region B, the second data lines DL2 may be disposed vertically across the second region B, and the second region B may receive the data voltages Vdata through the vertical link lines VL disposed in the first region A and the horizontal link lines HL disposed in the third region C. The boundary between the second region B and the third region C may, for example, be inclined outward toward the top of the display panel 100. In other words, the second region B may have an approximately right-triangular shape (or tapered shape) whose width becomes narrower toward the top of the display panel 100. The second regions B may be placed on the left and right sides of the display region AA.

In addition, in the third region C, the first data lines DL1 and the second data lines DL2 may be disposed together vertically across the third region C. For example, the first data lines DL1 may be placed in a portion of the third region C close to the first region A, and the second data lines DL2 may be placed in a portion of the third region C close to the second region B. The third region C may be interposed between the first and second regions A and B, and may have, for example, a roughly triangular shape (or an inversely tapered shape) whose width becomes wider toward the top of the display panel 100. The third region C may be placed on the left and right sides of the display region AA.

The fourth region D may be a region where the vertical link lines VL and the horizontal link lines HL are not arranged. For example, the fourth region D may be located on one side, for example, on an upper side of the first to third regions A to C. The first data lines DL1 and the second data lines DL2 may be disposed in the fourth region D. Regarding the fourth region D, a portion of the fourth region D located corresponding to the first region A (i.e., located above the first region A) may receive the data voltages Vdata through the first data lines DL1, and a portion of the fourth region D located corresponding to the second region B (i.e., located above the second region B) may receive the data voltages Vdata through the second data lines DL2.

As above, inside the second region B, to which the data voltage Vdata is transmitted through the vertical link line VL, in the horizontal direction, the first region A through which the vertical link line VL passes may be located. Accordingly, when applying the data voltage Vdata to the second region B, crosstalk may occur in the first region A which is electrically coupled to the vertical link line VL transmitting the data voltage Vdata by the parasitic capacitance.

Figure 6:
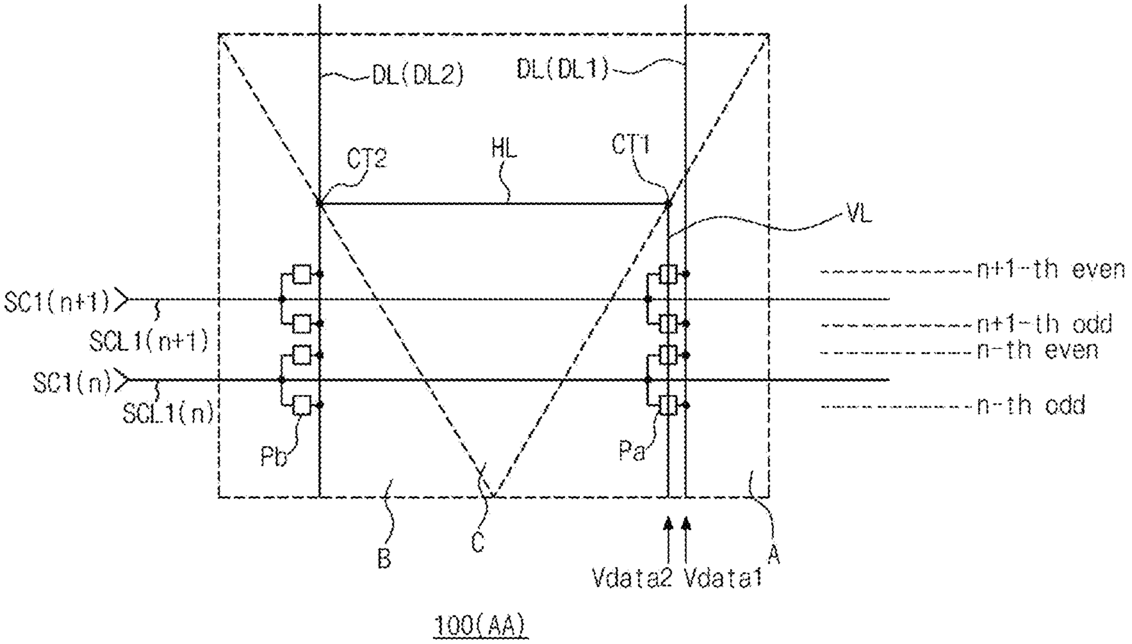
FIGS. 6 to 8 are views schematically illustrating a crosstalk occurrence mechanism in a first region due to a change in a data voltage provided to a second region in a display apparatus according to an aspect of the present disclosure.
Figure 7:
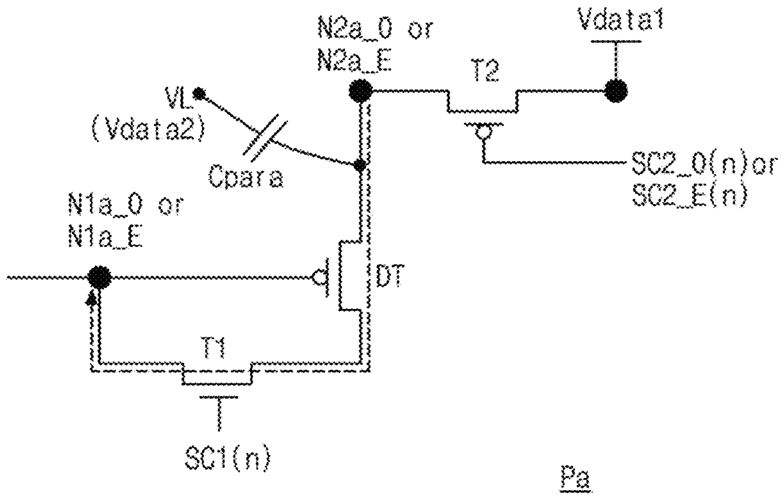
Figure 8:
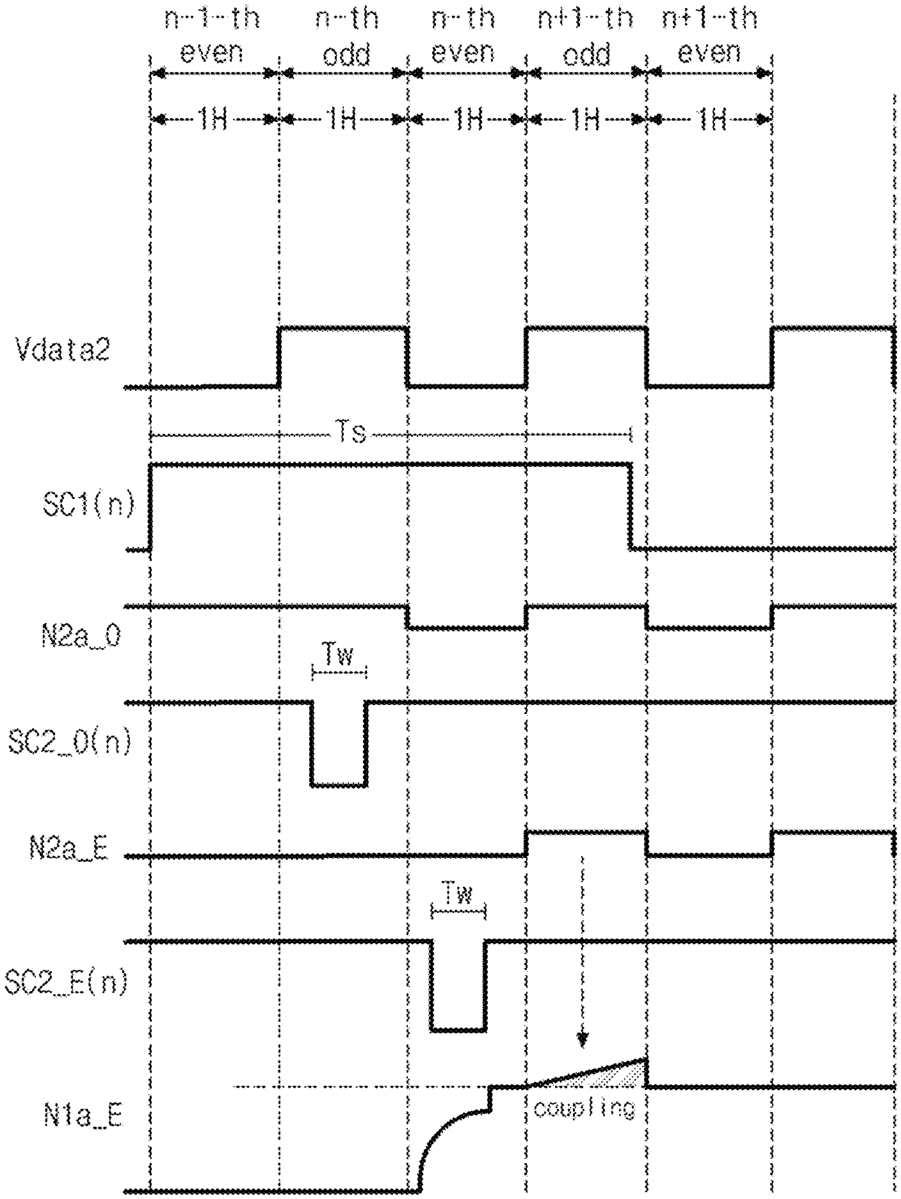

This is described with further reference to FIGS. 6 to 8. FIGS. 6 to 8 are views schematically illustrating a crosstalk occurrence mechanism in a first region due to a change in a data voltage provided to a second region in a display apparatus according to an aspect of the present disclosure. FIG. 6 schematically shows pixels in a first region where the crosstalk occurs, vertical link lines electrically coupled thereto, and pixels in a second region which substantially cause the crosstalk. FIG. 7 schematically shows an electrical coupling state between the vertical link line and the pixel in the first region. FIG. 8 is a timing diagram schematically showing a crosstalk phenomenon occurring in the pixel in the first region when a data voltage is applied to the second region.

Referring to FIGS. 6 to 8, as mentioned above, the odd horizontal line and the even horizontal line, which are two horizontal lines adjacent to each other in the display region AA of the display panel 100, may share the corresponding first scan signal SC1(n) or SC1(n+1) applied to the first transistors T1. That is, the sampling transistors of the first and second pixels Pa and Pb located on n-th odd and even horizontal lines may receive a same first scan signal.

Accordingly, for example, first pixels Pa, which are the pixels Pa of the first region A located on the n-th odd and even horizontal lines, and second pixels Pb, which are the pixels Pb of the second region B on the n-th odd and even horizontal lines, may be connected to a n-th first scan line SCL1(n) disposed on the n-th horizontal line. Likewise, the first pixels Pa of the first region A located on the n+1-th odd and even horizontal lines, and the second pixels Pb of the second region B located on the n+1-th odd and even horizontal lines may be connected to a n+1-th first scan line SCL1(n+1) disposed on the n+1-th horizontal line.

Meanwhile, the first pixel Pa of the first region A may be connected to the first data line DL1, and may receive a first data voltage Vdata1, which is the data voltage Vdata1 corresponding to the first pixel Pa, by one horizontal period 1H and be charged in a data writing section Tw of the one horizontal period 1H. For example, a first data voltage Vdata1 may be provided to the n-th odd horizontal line during one horizontal cycle 1H of the n-th odd horizontal line, then a first data voltage Vdata1 may be provided to the n-th even horizontal line during one horizontal cycle 1H of the n-th even horizontal line, then a first data voltage Vdata1 may be provided to the n+1-th odd horizontal line during one horizontal period 1H of the n+1-th odd horizontal line, and then a first data voltage Vdata1 may be provided to the n+1-th even horizontal line during one horizontal period 1H of the n+1-th even horizontal line.

The second pixel Pb of the second region B may be connected to the second data line DL which is connected to the vertical link line VL and the horizontal link line HL, and may receive a second data voltage Vdata2, which is the data voltage Vdata2 corresponding to the second pixel Pb, by one horizontal period 1H and be charged in the data writing section Tw of the one horizontal period 1H. For example, a second data voltage Vdata2 may be provided to the n-th odd horizontal line during one horizontal period 1H of the n-th odd horizontal line, then a second data voltage Vdata2 may be provided to the n-th even horizontal line during one horizontal period 1H of the n-th even horizontal line, then a second data voltage Vdata2 may be provided to the n+1-th odd horizontal line during one horizontal period 1H of the n+1-th odd horizontal line, and then a second data voltage Vdata2 may be provided to the n+1-th even horizontal line during one horizontal period 1H of the n+1-th even horizontal line.

Charging (or writing) the data voltages of the first and second pixels Pa and Pb as above may be performed in the data writing section Tw that is a section of a turn-on voltage (e.g., low voltage) of the second scan signal SC2 in each horizontal period 1H which is applied to the second transistor T2. For example, the n-th odd second scan signal SC2_O(n) may be applied to the pixels Pa and Pb of the n-th odd horizontal line, so the data voltages Vdata1 and Vdata2 may be charged to the gate electrodes of the driving transistors DT of the pixels Pa and Pb. Then, the n-th even second scan signal SC2_E(n) may be applied to the pixels Pa and Pb of the n-th even horizontal line, so the data voltages Vdata1 and Vdata2 may be charged to gate electrodes of the driving transistors DT of the pixels Pa and Pb.

Meanwhile, each of the first scan signal SC1(n) and SC1(n+1) respectively provided to the n-th horizontal line and the n+1-th horizontal line may have a turn-on voltage (e.g., high voltage) longer than 2 horizontal periods (2H) of the corresponding odd and even horizontal lines. For example, each of the first scan signals SC1(n) and SC1(n+1) may have a pulse width of approximately 4H (or longer), and this pulse may overlap with one horizontal period 1H of the previous even horizontal line and one horizontal period 1H of the next odd horizontal line. For example, the pulse of the first scan signal SC1(n) provided to the n-th horizontal line may have a timing corresponding to one horizontal period 1H of the n−1-th even horizontal line, two horizontal periods (2H) of the n-th odd and even horizontal lines, and one horizontal period 1H of the n+1-th odd horizontal line.

Meanwhile, as mentioned above, the first pixel Pa of the first region A may overlap with the vertical link line VL that transmits the second data voltage Vdata2 to the second region B, so that the parasitic capacitance Cpara occurs between the first pixel Pa and the vertical link line VL and the first pixel Pa and the vertical link line VL are electrically coupled.

For example, as shown in FIG. 7, the second node (N2a: N2a_O or N2a_E) of the first pixel Pa may overlap with the vertical link line VL, and the parasitic capacitance Cpara may be formed therebetween.

Accordingly, an amount of change in the second data voltage Vdata2 provided to the second pixel Pb through the vertical link line VL may be coupled to and reflected in the first node (N1a: N1a_O or N1a_E) of the first pixel Pa during a sampling section Ts when the first scan signal SC1(n) or SC1(n+1) (more specifically, its turn-on voltage pulse) is applied. Accordingly, the charging amount of the data voltage Vdata1 of the driving transistor DT of the first pixel Pa may vary depending on the coupling amount and be distorted.

For example, the first pixel Pa located on the n-th even horizontal line may be supplied with and charged with the corresponding first data voltage Vdata1 in one horizontal period 1H of the n-th even horizontal line, and then its first transistor T1 may be turned on until one horizontal period 1H of the n+1-th odd horizontal line (or in one horizontal period 1H of the n+1-th odd horizontal line). Accordingly, the amount of voltage change between a second data voltage Vdata2, which is applied to the second pixel Pb of the n-th even horizontal line through the vertical link line VL that forms the parasitic capacitance Cpara with the second node N2a_E of the first pixel Pa, and a second data voltage Vdata2 applied to the second pixel Pb of the n+1-th odd horizontal line (i.e., Vdata2 (of n+1-th odd)−Vdata2 (of n-th even)) may be reflected in the first node N1a_E of the first pixel Pa of the n-th even horizontal line.

As such, in the first pixel Pa located on the n-th even horizontal line, additional residual voltage sampling may occur due to the data voltage change of the second pixel Pb which is electrically coupled to the first pixel Pa through the vertical link line VL. Thus, the charging amount of voltage may vary abnormally, so that crosstalk may occur.

In addition, the first pixel Pa located on the n-th odd horizontal line may be supplied with and charged with the corresponding first data voltage Vdata1 in one horizontal period 1H of the n-th odd horizontal line, and then its first transistor T1 may be turned on until one horizontal period 1H of the n+1-th odd horizontal line (or in one horizontal period 1H of the n+1-th odd horizontal line). Accordingly, the amount of voltage change between a second data voltage Vdata2, which is applied to the second pixel Pb of the n-th odd horizontal line through the vertical link line VL that forms the parasitic capacitance Cpara with the second node N2a_O of the first pixel Pa, and a second data voltage Vdata2 applied to the second pixel Pb of the n-th even horizontal line (i.e., Vdata2 (of n-th even)−Vdata2 (of n-th odd)), and the amount of voltage change between a second data voltage Vdata2 applied to the second pixel Pb of the n-th even horizontal line, and a second data voltage Vdata2 applied to the second pixel Pb of the n+1-th odd horizontal line (i.e., Vdata2 (of n+1-th odd)−Vdata2 (of n-th even)) may be reflected in the first node N1a_O of the first pixel Pa of the n-th odd horizontal line.

As such, in the first pixel Pa located on the n-th odd horizontal line, additional residual voltage sampling may occur due to the data voltage change of the second pixel Pb which is electrically coupled to the first pixel Pa through the vertical link line VL. Thus, the charging amount of voltage may vary abnormally, so that crosstalk may occur.

Moreover, as mentioned above, since the first scan signal SC1(n) or SC1(n+1)) may be commonly applied to the odd and even horizontal lines, the odd and even horizontal lines of the first region A may have a difference in voltage coupling amount (or charge coupling amount) according to the amount of change in the second data voltage Vdata2.

In this regard, in this aspect, as mentioned above, the data compensation portion 300 may calculate the coupling amount generated by the parasitic capacitance Cpara and caused in the first pixel according to a change of data voltage that is applied to the vertical link line VL and provided to the second pixels Pb during the sampling section after the data writing section of the first pixel Pa, or by applying a coupling gain to an amount of change in second input image data of the second pixels Pb during a turn-on section of the sampling transistor of the first pixel Pa after a horizontal period of the first pixel Pa, calculate the compensation value that may compensate for the calculated coupling amount, reflect (or apply) the compensation value to the input image data Di of the first pixel Pa, and generate the output image data Do that may compensate for crosstalk.

Configuration and operation of the data compensation portion 300 is described in more detail.

Figure 9:
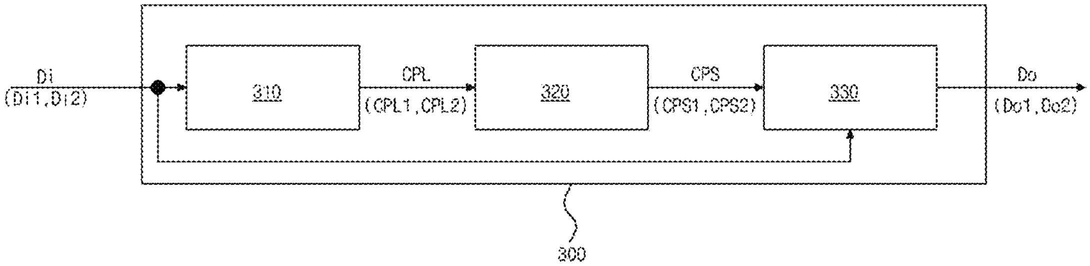
FIG. 9 is a view schematically illustrating a configuration of a data compensation portion according to an aspect of the present disclosure.
Figure 10:
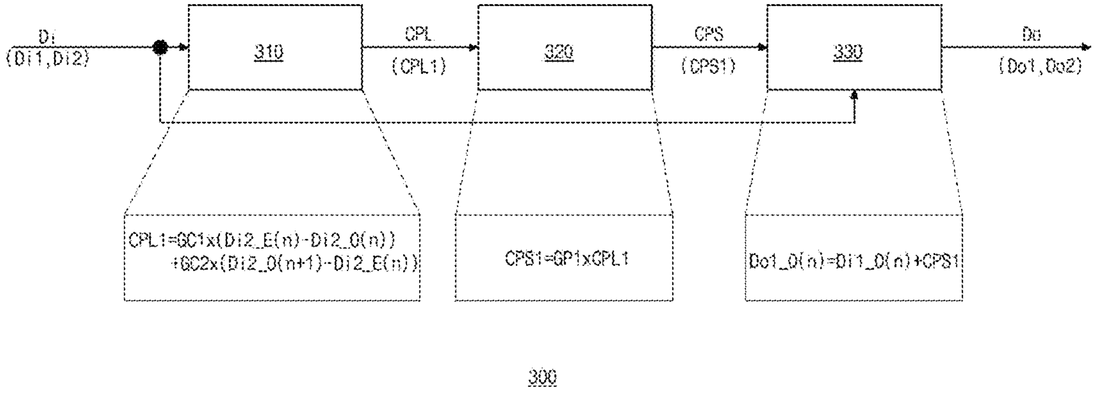
FIG. 10 is a view schematically illustrating processes of compensating input image data corresponding to pixels of a n-th odd horizontal line in a data compensation portion according to an aspect of the present disclosure.
Figure 11:
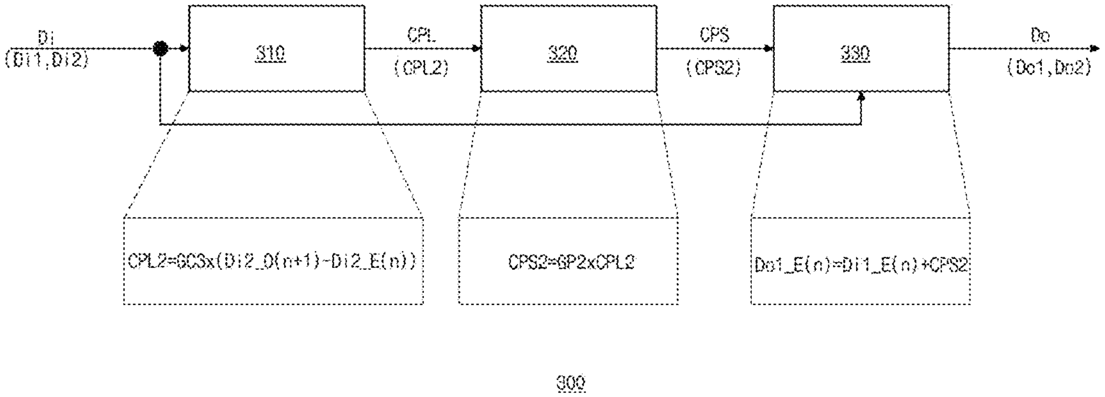
FIG. 11 is a view schematically illustrating processes of compensating input image data corresponding to pixels of a n-th even horizontal line in a data compensation portion according to an aspect of the present disclosure.

FIG. 9 is a view schematically illustrating a configuration of a data compensation portion according to an aspect of the present disclosure. FIG. 10 is a view schematically illustrating processes of compensating input image data corresponding to pixels of a n-th odd horizontal line in a data compensation portion according to an aspect of the present disclosure. FIG. 11 is a view schematically illustrating processes of compensating input image data corresponding to pixels of a n-th even horizontal line in a data compensation portion according to an aspect of the present disclosure.

Referring to FIGS. 9 to 11 along with FIGS. 6 to 8, the data compensation portion 300 may include, for example, a coupling amount calculation portion 310, a compensation value calculation portion 320, and a compensation processing portion 330.

The input image data Di may be provided in parallel (or in common) to, for example, the coupling amount calculation portion 310 and the compensation processing portion 330.

Here, for convenience of explanation, the input image data Di corresponding to the first region A, more specifically, the first pixel Pa of the first region A may be referred to as a first input image data Di1. The input image data Di corresponding to the second region B, more specifically, the second pixel Pb of the second region B may be referred to as a second input image data Di2. In addition, the input image data Di may include a third input image data corresponding to the pixel in the third region C and a fourth input image data corresponding to the pixel in the fourth region D.

For the first pixel Pa in the first region A, the coupling amount calculation portion 310 may calculate a voltage coupling amount CPL caused by the change in the second data voltage Vdata2 which is transmitted through the vertical link line VL that is connected to the second pixel Pb and overlaps with the first pixel Pa to form the parasitic capacitance Cpara.

In this regard, for example, as mentioned above, the sampling section Ts, which is the turn-on section of the first scan signal SC1(n) commonly provided to the n-th odd and even horizontal lines, may be located even in the horizontal period 1H of the n+1-th odd horizontal line.

Accordingly, the first transistor T1 of the first pixel Pa located in each of the n-th odd and even horizontal lines may maintain the turn-on state even during the horizontal period 1H of the n+1-th odd horizontal line.

Accordingly, for the first pixel Pa located on the n-th odd horizontal line, within the sampling section Ts of the n-th first scan signal SC1(n) after writing the corresponding first data voltage Vdata1 in the horizontal period 1H (or data writing section Tw) of the n-th odd horizontal line, a voltage coupling may be caused according to the change of the second data voltage Vdata2 (i.e., Vdata2 (of n-th even)−Vdata2 (of n-th odd)) in the horizontal period 1H of the n-th even horizontal line, and further, a voltage coupling may be caused according to the change of the second data voltage Vdata2 (i.e., Vdata2 (of n+1-th odd)−Vdata2 (of n-th even)) in the horizontal period 1H of the n+1-th odd horizontal line.

As such, the first pixel Pa located on the n-th odd horizontal line may have the voltage coupling according to the change in the second data voltage Vdata2 between the n-th odd horizontal line and the n-th even horizontal line, and the voltage coupling according to the change in the second data voltage Vdata2 between the n-th even horizontal line and the n+1-th odd horizontal line, so that the voltage charged in the gate electrode of the driving transistor DT may change.

Thus, for the first pixel Pa of the first region A located on the n-th odd horizontal line, it would be desirable to calculate the voltage coupling amounts induced twice for crosstalk compensation. The coupling amount calculation portion 310 may calculate the voltage coupling amount by applying a coupling gain to an amount of change in the second input image data during the sampling section after the data writing section of the first pixel Pa.

Reflecting this, to compensate for the first input image data Di1 of the first pixel Pa located on the odd horizontal line, for example, the n-th odd horizontal line, the coupling amount calculation portion 310 may calculate the data change amount (or gray level change amount) between the second input image data Di2 of the second pixel Pb located on the n-th odd horizontal line and the n-th even horizontal line, and the data change amount (or gray level change amount) between the second input image data Di2 of the second pixel Pb located on the n-th even horizontal line and the n+1-th odd horizontal line.

For example, with reference to FIG. 10, the coupling amount calculation portion 310 may calculate a first voltage coupling amount CPL1 for the first pixel Pa of the n-th odd horizontal line according to a following equation (1).

$$CPL1 = GC1 * (Di2\_E(n) - Di2\_O(n)) + GC2 * (Di2\_O(n+1) - Di2\_E(n)). \quad \text{Equation (1)}$$

Here, Di2_E(n) represents a data value of the second input image data Di2 of the second pixel Pb of the n-th even horizontal line. Di2_O(n) represents a data value of the second pixel Pb of the n-th odd horizontal line. Di2_O(n+1) represents a data value of the second input image data Di2 of the second pixel Pb of the n+1-th odd horizontal line. GC1 is a first coupling gain, and GC2 is a second coupling gain.

As such, in calculating the voltage coupling amount CPL1 for the first pixel Pa of the n-th odd horizontal line, the coupling amount calculation portion 310 may calculate the change amount (Di2_E(n)−Di2_O(n)) between the second input image data Di2 of the second pixel Pb of the n-th odd horizontal line and the n-th even horizontal line, which are electrically coupled to the first pixel Pa, and multiply this change amount (Di2_E(n)−Di2_O(n)) by the first coupling gain GC1, which is a rate at which the change amount (Di2_E(n)−DiG2_O(n)) is coupled (or reflected) to the first pixel Pa, to obtain a first voltage coupling amount. In addition, the coupling amount calculation portion 310 may calculate the change amount (Di2_O(n+1)−Di2_E(n)) between the second input image data Di2 of the second pixel Pb of the n-th even horizontal line and the n+1-th odd horizontal line, which are electrically coupled to the first pixel Pa, and multiply this change amount (Di2_O(n+1)−Di2_E(n)) by the second coupling gain GC2, which is a rate at which the change amount (Di2_O(n+1)−Di2_E(n)) is coupled (or reflected) to the first pixel Pa, to obtain a second voltage coupling amount.

By adding up the first and second voltage coupling amounts calculated as above, the first voltage coupling amount CPL1 for the first pixel Pa of the n-th odd horizontal line may be finally calculated.

Meanwhile, for the first pixel Pa located on the n-th even horizontal line, within the sampling section Ts of the n-th first scan signal SC1(n) after writing the corresponding first data voltage Vdata1 in the horizontal period 1H (or data writing section Tw) of the n-th even horizontal line, a voltage coupling may be caused according to the change of the second data voltage Vdata2 (i.e., Vdata2 (of n+1-th odd)−Vdata2 (of n-th even)) in the horizontal period 1H of the n+1-th odd horizontal line.

As such, the first pixel Pa located on the n-th even horizontal line may have the voltage coupling according to the change in the second data voltage Vdata2 between the n-th even horizontal line and the n+1-th odd horizontal line, so that the voltage charged in the gate electrode of the driving transistor DT may change.

Thus, for the first pixel Pa of the first region A located on the n-th even horizontal line, it would be desirable to calculate the voltage coupling amount induced once for crosstalk compensation.

Reflecting this, to compensate for the first input image data Di1 of the first pixel Pa located on the even horizontal line, for example, the n-th even horizontal line, the coupling amount calculation portion 310 may calculate the data change amount between the second input image data Di2 of the second pixel Pb located on the n-th even horizontal line and the n+1-th odd horizontal line.

For example, with reference to FIG. 11, the coupling amount calculation portion 310 may calculate the second voltage coupling amount CPL2 for the first pixel Pa of the n-th even horizontal line according to a following equation (2).

$$CPL2 = GC3 * (Di2\_O(n+1) - Di2\_E(n)). \quad \text{Equation (2)}$$

Here, GC3 is a third coupling gain.

As such, in calculating the voltage coupling amount CPL2 for the first pixel Pa of the n-th even horizontal line, the coupling amount calculation portion 310 may calculate the change amount (Di2_O(n+1)–Di2_E(n)) between the second input image data Di2 of the second pixel Pb of the n-th even horizontal line and the n+1-th odd horizontal line, and multiply this change amount (Di2_O(n+1)–Di2_E(n)) by the third coupling gain GC3, which is a rate at which the change amount (Di2_O(n+1)–Di2_E(n)) is coupled (or reflected) to the first pixel Pa, to obtain the second voltage coupling amount CPL2.

As above, for each horizontal line of the first region A forming the parasitic capacitance Cpara with the vertical link line VL, the coupling amount calculation portion 310 may calculate the voltage coupling amount CPL which is caused by the change in the second data voltage Vdata2 of the second region B during the sampling section Ts after the data writing section Tw.

Moreover, in the first region A, the odd horizontal line and the even horizontal line may be different in number of changes in the second data voltage Vdata2 that affects the odd horizontal line and the even horizontal line. Thus, the voltage coupling amounts (CPL:CPL1 and CPL2) for the odd horizontal line and the even horizontal line of the first region A may be configured to be calculated individually.

The voltage coupling amounts CPL calculated by the coupling amount calculating portion 310 as described above may be provided to the compensation value calculating portion 320.

The compensation value calculation portion 320 may calculate compensation values CPS to compensate for the voltage coupling amounts CPL for the pixels Pa of the first region A.

In this regard, the compensation value calculation portion 320 may, for example, separate the odd horizontal line and the even horizontal line of the first region A and individually compensate them. Regarding this, as mentioned above, the number and timing of voltage coupling with the second data voltage Vdata2 may be different between the odd and even horizontal lines of the first region A, so it would be desirable to separately apply compensation coefficients to calculate the compensation values CPS for the odd horizontal line and the even horizontal line.

For example, with reference to FIG. 10, for the first pixel Pa of the n-th odd horizontal line, the first compensation value CPS1 may be calculated according to a following equation (3).

$$CPS1 = GP1 * CPL1. \quad \text{Equation (3)}$$

Here, GP1 is a first compensation gain representing the compensation coefficient for the odd horizontal line.

As such, the compensation value calculation portion 320 may multiply the voltage coupling amount CPL1 for the first pixel Pa of the input n-th odd horizontal line by the corresponding first compensation gain GP1 to obtain the first compensation value CPS1 for compensating for the voltage coupling.

Meanwhile, with reference to FIG. 11, for the first pixel Pa of the n-th even horizontal line, the second compensation value CPS2 may be calculated according to a following equation (4).

$$CPS2 = GP2 * CPL2. \quad \text{Equation (4)}$$

Here, GP2 is a second compensation gain representing the compensation coefficient for the even horizontal line.

As such, the compensation value calculation portion 320 may multiply the voltage coupling amount CPL2 for the first pixel Pa of the input n-th even horizontal line by the corresponding second compensation gain GP2 to obtain the second compensation value CPS2 to compensate for the voltage coupling.

The compensation values CPS calculated by the compensation value calculation portion 320 as described above may be provided to the compensation processing portion 330.

The compensation processing portion 330 may receive the input image data Di and perform crosstalk compensation processing on the first input image data Di1 of the first region A where the crosstalk occurs. In addition, the input image data Di of other regions B, C, and D where crosstalk does not substantially occur may be output as is without performing crosstalk compensation processing.

In this regard, for example, the first input image data Di1 of the first region A may be applied with the corresponding compensation value CPS, so that the output image data Do that may compensate for the voltage coupling caused may be generated.

In addition, crosstalk compensation may be omitted for the second input image data Di2 of the second region B, and the second input image data Di2 may be output as the second output image data Do2. Similarly, crosstalk compensation may be omitted for the input image data Di of the third and fourth regions C and D, and the input image data may be output as output image data Do.

Meanwhile, as mentioned above, the individual compensation values CPS1 and CPS2 may be obtained for the odd horizontal line and the even horizontal line of the first region A and be provided to the compensation processing portion 330, so that the compensation processing for the first input image data Di1 may also be performed individually for each horizontal line.

In this regard, for example, with reference to FIG. 10, for the first pixel Pa of the n-th odd horizontal line, the compensated first output image data Do1 may be generated according to a following equation (5).

$$Do1\_O(n) = Di1\_O(n) + CPS1. \quad \text{Equation (5)}$$

Here, Di1_O(n) represents the data value of the first input image data Di1 of the first pixel Pa of the n-th odd horizontal line. Do1_O(n) represents the data value of the first output image data Do1 of the first pixel Pa of the n-th odd horizontal line.

As such, the compensation processing portion 330 may add the first input image data Di1 of the first pixel Pa of the input n-th odd horizontal line and the corresponding first compensation value CPS1 to obtain the first output image data Do1 for compensating for the voltage coupling.

Meanwhile, with reference to FIG. 11, for the first pixel Pa of the n-th even horizontal line, the compensated first output image data Do1 may be generated according to a following equation (6).

$$Do1\_E(n) = Di1\_E(n) + CPS2. \quad \text{Equation (6)}$$

Here, Di1_E(n) represents the data value of the first input image data Di1 of the first pixel Pa of the n-th even horizontal line. Do_E(n) represents the data value of the first output image data Do1 of the first pixel Pa of the n-th even horizontal line.

As such, the compensation processing portion 330 may add the first input image data Di1 of the first pixel Pa of the input n-th even horizontal line and the corresponding second compensation value CPS2 to obtain the first output image data Do1 for compensating for the voltage coupling.

Figure 12A:
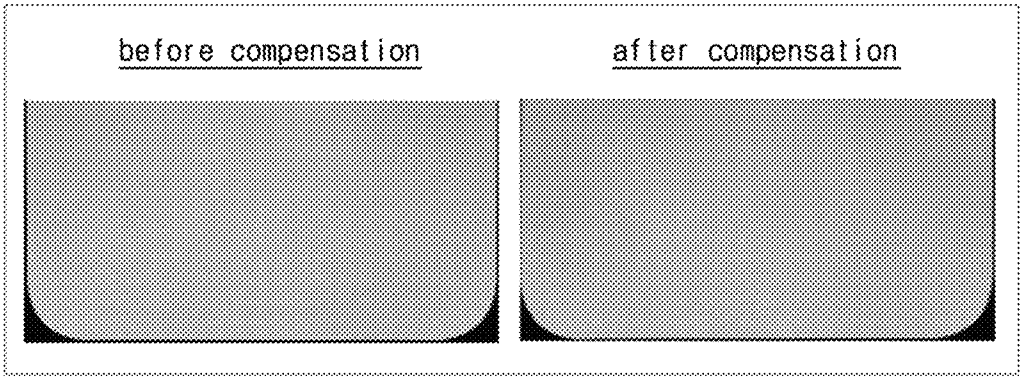
FIGS. 12A and 12B are views illustrating experimental results before and after applying crosstalk compensation according to an aspect of the present disclosure.
Figure 12B:
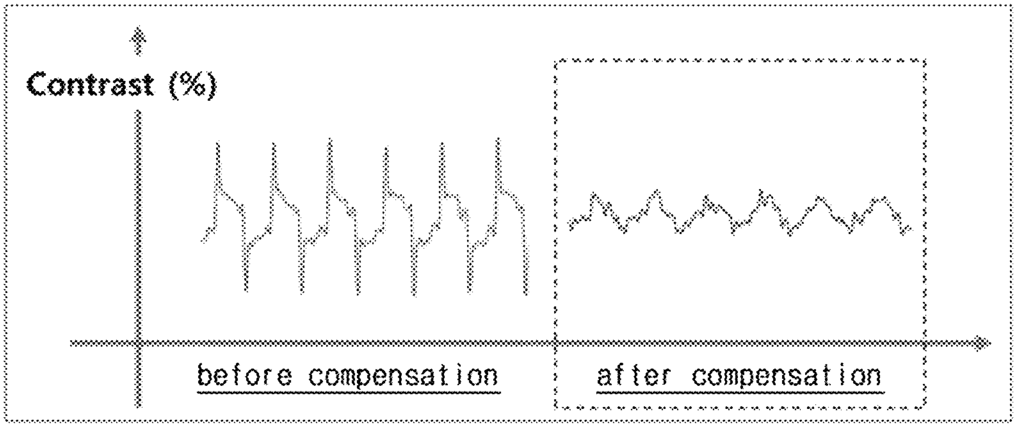

FIGS. 12A and 12B are views illustrating experimental results before and after applying crosstalk compensation according to an aspect of the present disclosure.

FIG. 12A shows screens before and after applying crosstalk compensation of this aspect, and FIG. 12B shows luminance profiles in a first region, where vertical link lines are arranged, before and after applying crosstalk compensation in this aspect.

Meanwhile, in the experiment of FIGS. 12A and 12B, a pattern in which high gray level (e.g., white) and low gray level (e.g., black) are repeated along a vertical direction is displayed in a second region (B of FIG. 4).

Referring to FIG. 12A, it may be seen that before crosstalk compensation, triangular crosstalk occurs in the first region, and after crosstalk compensation, the crosstalk in the first region is substantially not recognized and is thus improved.

Referring to FIG. 12B, it may be seen that before crosstalk compensation, the luminance profile (contrast) of the first region changes rapidly and crosstalk occurs, and after crosstalk compensation, the change in the luminance profile of the first region is greatly reduced and the crosstalk is thus improved.

As described above, according to the aspect of the present disclosure, for the pixel located in the region where the vertical link line is arranged and forming the parasitic capacitance with the vertical link line, the image data may be compensated by calculating the coupling amount caused by the parasitic capacitance according to the change of the data voltage applied to the vertical link line and calculating the compensation value for the coupling amount.

Accordingly, the crosstalk occurring in the pixel due to the coupling with the data voltage applied to the vertical link line may be improved.

Furthermore, for the pixels of the odd and even horizontal lines that commonly receive the scan signal applied to the sampling transistors, the image data may be compensated by calculating the coupling amounts and the compensation values individually for each horizontal line.

Accordingly, the crosstalk due to the coupling amounts that occur differently for the odd and even horizontal lines may be effectively improved.

It will be apparent to those skilled in the art that various modifications and variation may be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A display apparatus, comprising:

a display panel in which a display region including first to third regions arranged in a horizontal direction is defined, and which includes a first data line and a second data line extending in a vertical direction and respectively connected to first pixels of the first region and second pixels of the second region;

a driving transistor, a sampling transistor, and a data supply transistor included in each of the first and second pixels, the driving transistor having a gate electrode connected to a first node, the sampling transistor connected between a first electrode of the driving transistor and the first node and turned on during a sampling section, and the data supply transistor connected to a second electrode of the driving transistor at a second node and turned on during a data writing section within the sampling section;

a vertical link line disposed in the first region, extending in the vertical direction, and forming a parasitic capacitance with the first node of the first pixel;

a horizontal link line disposed in the third region between the first and second regions, and connecting the vertical link line and the second data line; and a data compensation circuit which calculates a voltage coupling amount caused in the first pixel according to a change of data voltage that is applied to the vertical link line and provided to the second pixels during the sampling section after the data writing section of the first pixel, calculates a compensation value for the voltage coupling amount, and applies the compensation value to a first input image data of the first pixel to generate a compensated image data.

2. The display apparatus of claim 1, wherein the data compensation circuit includes:

a coupling amount calculation circuit which receives second input image data of the second pixels, and calculates the voltage coupling amount by applying a coupling gain to an amount of change in the second input image data during the sampling section after the data writing section of the first pixel;

a compensation value calculation circuit that calculates the compensation value by applying a compensation gain to the voltage coupling amount provided from the coupling amount calculation circuit; and a compensation processing circuit which generates the compensated image data by applying the compensation value provided from the compensation value calculation circuit to the first input image data.

3. The display apparatus of claim 2, wherein the sampling transistors of the first and second pixels located on n-th odd (n being an integer) and even horizontal lines receive a same first scan signal, and wherein the data compensation circuit is configured to:

calculate a first voltage coupling amount by multiplying a data change amount between the second input image data of the second pixels of the n-th odd and even horizontal lines by a first coupling gain, calculate a second voltage coupling amount by multiplying a data change amount between the second input image data of the second pixels of the n-th even horizontal line and a (n+1)-th odd horizontal line by a second coupling gain, and calculate the voltage coupling amount by adding the first and second voltage coupling amounts;

calculate a first compensation value by multiplying the voltage coupling amount by a first compensation gain; and generate the compensated image data by adding the first compensation value to the first input image data of the first pixel of the n-th odd horizontal line.

4. The display apparatus of claim 2, wherein the sampling transistors of the first and second pixels located on n-th odd (n being an integer) and even horizontal lines receive a same first scan signal, and wherein the data compensation circuit is configured to:

calculate the voltage coupling amount by multiplying a data change amount between the second input image data of the second pixels of the n-th even horizontal line and an (n+1)-th odd horizontal line by a third coupling gain;

calculate a second compensation value by multiplying the voltage coupling amount by a second compensation gain; and generate the compensated image data by adding the second compensation value to the first input image data of the first pixel of the n-th even horizontal line.

5. The display apparatus of claim 1, wherein the data supply transistors of the first and second pixels located on an odd horizontal line and an even horizontal line adjacent to each other respectively receive odd and even second scan signals at different horizontal periods.

6. The display apparatus of claim 1, further comprising a data driving circuit connected to the first data line and the vertical link line at one end of the display panel, wherein each of the first and second regions has a triangular shape whose width becomes narrower as it moves away from the one end of the display panel in the vertical direction, and wherein the third region has a triangular shape whose width becomes wider as it moves away from the one end of the display panel in the vertical direction.

7. The display apparatus of claim 6, wherein the display region further includes a fourth region which is located on one side of the first to third regions in the vertical direction, and in which the first and second data lines are disposed.

8. The display apparatus of claim 6, wherein the horizontal link lines increase in length as they move away from the one end of the display panel in the vertical direction.

9. The display apparatus of claim 1, wherein each of the first and second pixels includes a light emitting diode that receives an emission current generated by the driving transistor.

10. The display apparatus of claim 1, wherein the vertical link line is connected to the horizontal link line at a first connection point located within the display region, and the horizontal link line is connected to a corresponding second data line at a second connection point which is located within the display region and is opposite to the first connection point.

11. A display apparatus, comprising:

a display panel in which a first region and a second region disposed outside the first region in a horizontal direction are defined;

a first data line and a second data line which extend in a vertical direction, and are connected to first pixels of the first region and second pixels of the second region, respectively;

a driving transistor, a sampling transistor, and a data supply transistor included in each of the first and second pixels, the driving transistor whose gate electrode is connected to a first node, the sampling transistor connected between a first electrode of the driving transistor and the first node, and the data supply transistor connected to a second electrode of the driving transistor at a second node;

a vertical link line disposed between the first data lines adjacent to each other in the first region, and forming a parasitic capacitance with the first node of the first pixel;

a horizontal link line disposed between the first and second regions, and connecting the vertical link line and the second data line; and a data compensation circuit which calculates a voltage coupling amount by applying a coupling gain to an amount of change in second input image data of the second pixels during a turn-on section of the sampling transistor of the first pixel after a horizontal period of the first pixel, calculates a compensation value by applying a compensation gain to the voltage coupling amount, and generates a compensated image data by applying the compensation value to a first input image data of the first pixel.

12. The display apparatus of claim 11, wherein the sampling transistors of the first and second pixels located on n-th odd (n being an integer) and even horizontal lines receive a same first scan signal, where n is an integer and wherein the data compensation circuit is configured to:

calculate a first voltage coupling amount by multiplying a data change amount between the second input image data of the second pixels of the n-th odd and even horizontal lines by a first coupling gain, calculate a second voltage coupling amount by multiplying a data change amount between the second input image data of the second pixels of the n-th even horizontal line and an (n+1)-th odd horizontal line by a second coupling gain, and calculate the voltage coupling amount by adding the first and second voltage coupling amounts;

calculate a first compensation value by multiplying the voltage coupling amount by a first compensation gain; and generate the compensated image data by adding the first compensation value to the first input image data of the first pixel of the n-th odd horizontal line.

13. The display apparatus of claim 11, wherein the sampling transistors of the first and second pixels located on n-th odd (n being an integer) and even horizontal lines receive a same first scan signal, and wherein the data compensation circuit is configured to:

calculate the voltage coupling amount by multiplying a data change amount between the second input image data of the second pixels of the n-th even horizontal line and a n+1-th odd horizontal line by a third coupling gain;

calculate a second compensation value by multiplying the voltage coupling amount by a second compensation gain; and generate the compensated image data by adding the second compensation value to the first input image data of the first pixel of the n-th even horizontal line.

14. The display apparatus of claim 11, wherein the data supply transistors of the first and second pixels located on an odd horizontal line and an even horizontal line adjacent to each other respectively receive odd and even second scan signals at different horizontal periods.

15. The display apparatus of claim 11, further comprising a data driving circuit connected to the first data line and the vertical link line at one end of the display panel, wherein each of the first and second regions has a triangular shape whose width becomes narrower as it moves away from the one end of the display panel in the vertical direction.

16. The display apparatus of claim 15, wherein the display panel includes:

a third region which is between the first and second region, and in which the horizontal link line is disposed; and a fourth region which is located on one side of the first to third regions in the vertical direction, and in which the first and second data lines are disposed.

17. The display apparatus of claim 15, wherein the horizontal link lines increase in length as they move away from the one end of the display panel in the vertical direction.

18. The display apparatus of claim 11, wherein each of the first and second pixels includes a light emitting diode that receives an emission current generated by the driving transistor.

19. The display apparatus of claim 11, wherein the vertical link line is connected to the horizontal link line at a first connection point located within the display region, and the horizontal link line is connected to a corresponding second data line at a second connection point which is located within the display region and is opposite to the first connection point.

* * * * *